United States Patent
Wang et al.

(10) Patent No.: US 12,530,799 B2
(45) Date of Patent: Jan. 20, 2026

(54) SYSTEM AND METHOD FOR EXTRINSIC PARAMETER CALIBRATION AND SELF-INSPECTION OF ON-VEHICLE CAMERAS

(71) Applicant: Black Sesame Technologies Co., Ltd., Wuhan (CN)

(72) Inventors: Chao Wang, Shanghai (CN); Zhaowei Xin, Shanghai (CN); Donghui Wu, San Mateo, CA (US)

(73) Assignee: BLACK SESAME TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/812,706

(22) Filed: Aug. 22, 2024

(65) Prior Publication Data
US 2026/0004459 A1  Jan. 1, 2026

(30) Foreign Application Priority Data
Jun. 26, 2024 (CN) .......................... 202410842328.1

(51) Int. Cl.
*G06T 7/80* (2017.01)
*G06T 5/40* (2006.01)
*G06T 7/13* (2017.01)
*G06V 10/44* (2022.01)
*G06V 20/56* (2022.01)

(52) U.S. Cl.
CPC ................. *G06T 7/80* (2017.01); *G06T 5/40* (2013.01); *G06T 7/13* (2017.01); *G06V 10/44* (2022.01); *G06V 20/588* (2022.01)

(58) Field of Classification Search
None
See application file for complete search history.

(56) References Cited

U.S. PATENT DOCUMENTS

| | | | | |
|---|---|---|---|---|
| 11,348,281 | B1* | 5/2022 | Tang | H04N 13/246 |
| 11,875,535 | B2* | 1/2024 | Zou | G06T 7/80 |
| 12,112,503 | B2* | 10/2024 | Yuan | H04N 17/002 |
| 12,249,100 | B2* | 3/2025 | Kobach | G06T 7/80 |
| 2022/0276360 | A1* | 9/2022 | Ma | G06T 7/80 |

(Continued)

FOREIGN PATENT DOCUMENTS

EP 2541498 A1 * 1/2013 ............... G06T 7/80

*Primary Examiner* — John W Miller
(74) *Attorney, Agent, or Firm* — Yao Legal Services, Inc.; Shun Yao

(57) ABSTRACT

The disclosure provides a system and method for calibrating extrinsic parameters of a camera mounted on a vehicle. While the vehicle is parked, the camera captures an image of a plurality of feature points with known world coordinates on a ground plane. The system determines pixel coordinates of the plurality of feature points in an image plane and estimates a homography matrix between the ground plane and the image plane based on a subset of the plurality of feature points. The system generates an initial estimate of the extrinsic parameters based on the estimated homography matrix and applies an optimization technique to obtain calibrated extrinsic parameters based on the initial estimate, the world coordinates, and the pixel coordinates of the plurality of feature points. Applying the optimization technique can include minimizing inverse-projection errors of the plurality of feature points from the image plane to the ground plane.

18 Claims, 7 Drawing Sheets

(56) References Cited

U.S. PATENT DOCUMENTS

| | | | |
|---|---|---|---|
| 2022/0366604 A1* | 11/2022 | Park | G06T 7/248 |
| 2022/0414933 A1* | 12/2022 | Sung | G06T 7/85 |
| 2023/0128689 A1* | 4/2023 | Qian | G06V 10/753 |
| | | | 382/289 |
| 2023/0177725 A1* | 6/2023 | Michitarian | H04N 17/002 |
| | | | 348/148 |
| 2023/0283906 A1* | 9/2023 | Liu | H04N 23/698 |
| | | | 348/148 |
| 2024/0404107 A1* | 12/2024 | Wang | G06T 7/80 |

* cited by examiner

SYSTEM AND METHOD FOR EXTRINSIC PARAMETER CALIBRATION AND SELF-INSPECTION OF ON-VEHICLE CAMERAS

RELATED APPLICATION

Under 35 U.S.C. 119, this application claims the benefits and rights of priority of Chinese Patent Application No. 202410842328.1, filed 26 Jun. 2024.

BACKGROUND

Field

This disclosure generally relates to autonomous driving. More specifically, the disclosed system and method relate to extrinsic parameter calibration and self-inspection of on-vehicle cameras.

Related Art

Cameras play a crucial role in autonomous driving, providing essential visual information to help vehicles perceive their surroundings and make informed decisions. For example, cameras installed at different locations of a vehicle can provide a 360° view of the vehicle's environment to allow the vehicle to detect surrounding objects such as traffic signs, lane lines, other vehicles, pedestrians, intersections, crosswalks, etc. More specifically, images captured by the on-vehicle cameras can be analyzed to determine three-dimensional (3D) information about the shape, size, and position of objects in the environment surrounding the vehicle. Such a technique can be referred to as photogrammetry.

Before performing photogrammetry analysis on images captured by an on-vehicle camera, the camera should be calibrated. For example, intrinsic parameters like focal length, lens distortion, and sensor characteristics should be calibrated to correct any distortions in the image. Moreover, extrinsic parameters (which define the position and orientation of the camera) also need to be calibrated. A conventional camera calibration process typically involves using the camera to capture images of a specially designed target (e.g., a checkerboard), computing the mapping between 3D world points and their corresponding 2D image points, and then solving for the camera parameters.

Any miscalibration can result in inaccurate measurement of the physical positions of the objects, which can then cause various perception tasks (e.g., map vectorization or object detection) relying on the captured images to fail. Conventional calibration methods can be inaccurate and inefficient. Moreover, after installation and initial calibration, a camera may be subject to position/pose changes. Timely detection of such changes can be essential to prevent perception errors.

SUMMARY

The disclosure provides a system and method for calibrating extrinsic parameters of a camera mounted on a vehicle. While the vehicle is parked, the camera can capture an image of a plurality of feature points with known world coordinates measured in a world coordinate system. The plurality of feature points are positioned on a ground plane upon which the vehicle is parked. The system can determine, based on the captured image, pixel coordinates of the plurality of feature points measured in a pixel coordinate system. The plurality of feature points are projected from the ground plane to an image plane of the camera. The system can estimate a homography matrix between the ground plane and the image plane based on a subset of the plurality of feature points. The system can generate an initial estimate of the extrinsic parameters based on the estimated homography matrix and apply an optimization technique to obtain calibrated extrinsic parameters based on the initial estimate of the extrinsic parameters, the world coordinates of the plurality of feature points, and the pixel coordinates of the plurality of feature points. Applying the optimization technique can include minimizing inverse-projection errors of the plurality of feature points from the image plane to the ground plane.

In a variation on this embodiment, generating the initial estimate of the extrinsic parameters can further include converting the estimated homography matrix to an extrinsic matrix by applying a camera direction constraint and a normalization constraint.

In a variation on this embodiment, minimizing the inverse-projection errors can include constructing an error vector and computing a Euclidean norm of the error vector. A respective component in the error vector corresponds to an inverse-projection error of a feature point, and the inverse-projection error indicates a distance on the ground plane between the feature point and a projection of the feature point from the image plane to the ground plane.

In a variation on this embodiment, the optimization technique comprises a Levenberg-Marquardt (LM) technique.

In a variation on this embodiment, the system can remove distortions from the image based on predetermined intrinsic parameters of the camera.

In a variation on this embodiment, the system can determine whether recalibration of the extrinsic parameters is needed subsequent to deploying the vehicle to road operations.

In a further variation, the system can determine a theoretical vanishing line based on the calibrated extrinsic parameters, obtain a stream of images captured by the camera while the vehicle is in motion, determine a vanishing point in each image of the stream of images, determine a distance between the vanishing point and the theoretical vanishing line, and collect statistics about the distance from all images in the stream of images.

In a further variation, determining the vanishing point can include detecting multiple lane lines in the image, fitting the multiple lane lines to corresponding straight lines, and determining a point in the image with a minimum sum of squared distances from the point to the straight lines.

In a further variation, collecting the statistics about the distance can include constructing a histogram indicating a distribution of the distance.

In a further variation, the system generates a notification in response to determining that recalibration of the extrinsic parameters is needed.

DESCRIPTION OF THE FIGURES

This present application is submitted with colored drawings. In accordance with 37 C.F.R. § 1.84(a)(2), a petition is submitted to request acceptance of the colored drawings as the only practical medium by which aspects of the subject matter sought to be patented in this application may be accurately conveyed.

In the figures, like reference numerals refer to the same figure elements.

DETAILED DESCRIPTION

The following description is presented to enable any person skilled in the art to make and use the disclosed embodiments and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

The disclosure describes a system and method for calibrating extrinsic parameters of on-vehicle cameras. The proposed calibration system can apply the Levenberg-Marquardt (LM) algorithm to optimize the extrinsic parameters by minimizing errors in the inverse mapping of feature points from the two-dimensional (2D) image plane to the three-dimensional (3D) world space. During calibration, a to-be-calibrated camera can capture an image of a target (e.g., a checkerboard pattern, and/or the end points of the lane lines) on the ground. The target can include a plurality of feature points (referred to as world feature points), and the physical positions of those feature points can be measured beforehand. Points in the 2D image corresponding to the world feature points can be referred to as image feature points. The calibration system can optimize the extrinsic parameters of the camera by minimizing the errors in the world coordinates (which define the physical locations of points in the world space) when the image feature points are projected back to the world space using the extrinsic parameters. The proposed calibration system can also perform self-inspection on the camera while the vehicle is in motion to determine whether previously calibrated extrinsic parameters are still valid. To do so, the system can first compute a theoretical vanishing line based on the previously calibrated extrinsic parameters and then determine, in each image frame from a sequence of image frames captured by the camera, a vanishing point. The system can further obtain statistics (e.g., the distribution) of the distance between the vanishing point and the vanishing line from the stream of image frames and determine whether recalibration of the camera is needed.

Camera Calibration Basics

Figure 1:
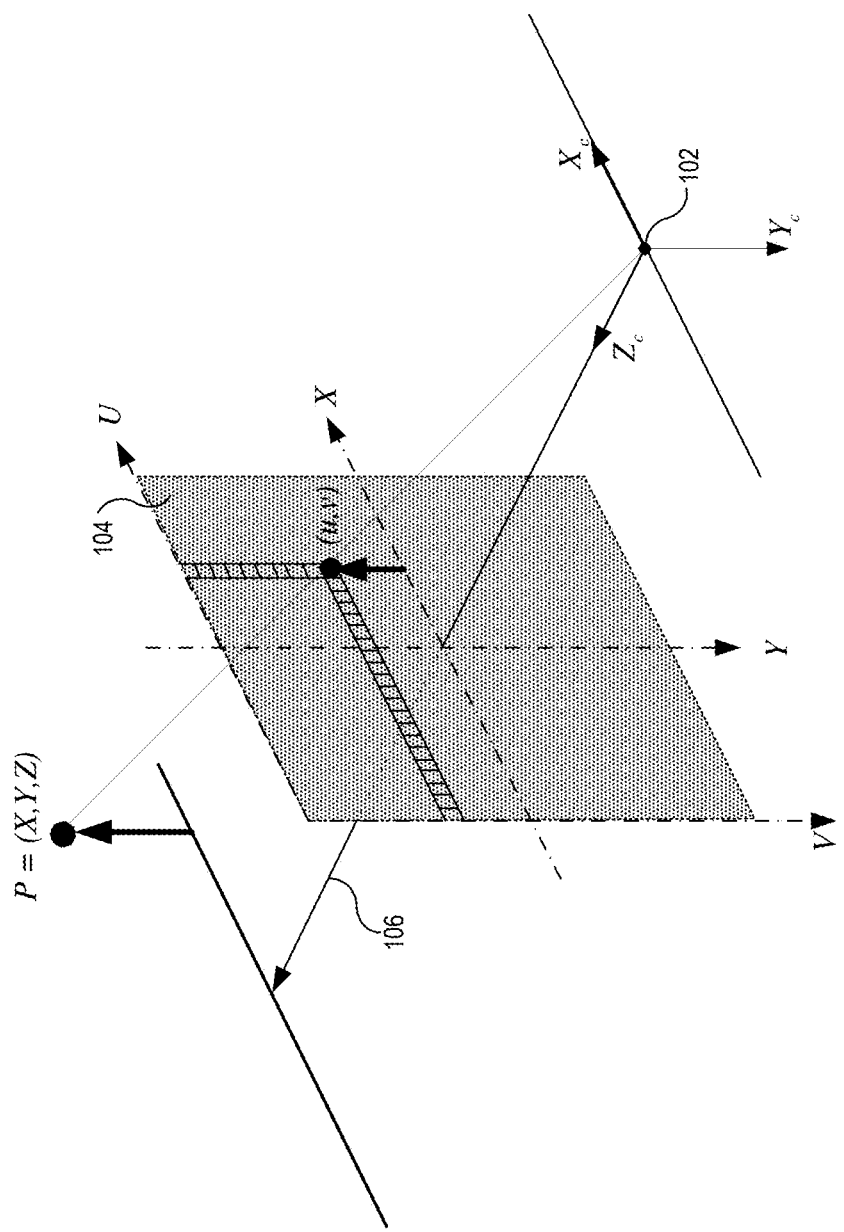
FIG. 1 illustrates an exemplary pinhole camera model, according to prior art.

FIG. 1 illustrates an exemplary pinhole camera model, according to prior art. A pinhole camera model describes the mathematical relationship of the projection of points in the 3D world space onto an image plane. More specifically, FIG. 1 shows four related coordinate systems in the pinhole model, including a 3D world coordinate system (denoted $O_{world}$), a 3D camera coordinate system (denoted $O_{camera}$), a 2D image coordinate system (denoted $O_{image}$), and a 2D pixel coordinate system (denoted $O_{pixel}$).

Coordinates in the world coordinate system $O_{world}$ can be denoted $(x_w, y_w, z_w)$. The world coordinate system $O_{world}$ is essentially a virtual coordinate system that can be chosen as any 3D coordinate system and can be fixed once it is chosen. Coordinates in the camera coordinate system $O_{camera}$ can be denoted $(x_c, y_c, z_c)$. The origin of the camera coordinate system $O_{camera}$ is located at the camera center point 102. The three axes of the camera coordinate system $O_{camera}$ can be marked as $X_c, Y_c, Z_c$, with $X_c$ axis in the horizontal direction of the camera, $Y_c$ axis in the vertical direction of the camera, and $Z_c$ axis pointing to the observer. The camera coordinate system $O_{camera}$ moves with the camera.

Coordinates in the image coordinate system $O_{image}$ can be denoted $(x, y)$ and are located on the image plane 104. The origin of the image coordinate system $O_{image}$ is located at the intersection between the image plane 104 and the optical axis (or principal axis) 106. The intersection point is also known as the principal point, and a plane through the camera center point 102 parallel to the image plane 104 is referred to as the principal plane of the camera. The X and Y axes of the image coordinate system $O_{image}$ are parallel to $X_c$ and $Y_c$ axes, respectively, of the camera coordinate system $O_{camera}$.

The pixel coordinate system $O_{pixel}$ is also on the image plane 104 with the coordinates denoted $(u, v)$ and measured by the pixel unit. The origin of the pixel coordinate system $O_{pixel}$ is located at the top-left corner of the image, and the U and V axes of the image coordinate system $O_{image}$ are parallel to X and Y axes, respectively, of the image coordinate system $O_{image}$.

FIG. 1 also shows that a point P (where P=(x, y, z)) in the world coordinate system $O_{world}$ can be projected to the image plane as a pixel point p (where p=(u, v)).

A point in the camera coordinate system can be denoted $P_c$, and the transformation from the world coordinate system $O_{world}$ to the camera coordinate system $O_{camera}$ can be expressed as $P_c = T_{cw} P_w$, where $T_{cw}$ is a transformation matrix comprising both a rotation component and a translation component regarding the camera's pose. The above transformation can be rewritten as:

$$\begin{bmatrix} x_c \\ y_c \\ z_c \\ 1 \end{bmatrix} = \begin{bmatrix} R & T \\ 0^T & 1 \end{bmatrix} \begin{bmatrix} x_w \\ y_w \\ z_w \\ 1 \end{bmatrix}, \quad (1)$$

where R is the rotation matrix, and T is translation matrix.

When points are projected from the 3D world space to the 2D image plane, the degree of freedom in the Z direction (i.e., along the optical axis 106) will be lost. According to the pinhole model, $$\frac{z_c}{f} = \frac{x_c}{x} = \frac{y_c}{y},$$

where f is the focal length. The transformation from the camera coordinate system $O_{camera}$ to the image coordinate system $O_{image}$ can then be expressed as:

$$\begin{bmatrix} x \\ y \\ 1 \end{bmatrix} = \frac{1}{z_c}\begin{bmatrix} f & 0 & 0 \\ 0 & f & 0 \\ 0 & 0 & 1 \end{bmatrix}\begin{bmatrix} x_c \\ y_c \\ z_c \end{bmatrix} = \frac{1}{z_c}\begin{bmatrix} f & 0 & 0 & 0 \\ 0 & f & 0 & 0 \\ 0 & 0 & 1 & 0 \end{bmatrix}\begin{bmatrix} x_c \\ y_c \\ z_c \\ 1 \end{bmatrix}. \qquad (2)$$

The transformation from the image coordinate system $O_{image}$ to the pixel coordinate system $O_{pixel}$ should consider the size of each pixel and the offset between the origins of the two coordinate systems. Denoting the pixel size of the sensor in horizontal and vertical directions as dx and dy, respectively, and $$\alpha = \frac{1}{dx},\ \beta = \frac{1}{dy},$$

the transformation from the image coordinate system $O_{image}$ to the pixel coordinate system $O_{pixel}$ can be expressed as:

$$\begin{aligned} u &= \alpha x + c_x \\ v &= \beta y + c_y \end{aligned}, \qquad (3)$$

where $(c_x, c_y)$ defines the location of the origin of the image coordinate system $O_{image}$ in the pixel coordinate system $O_{pixel}$. Equations (3) can also be written in a matrix format as:

$$\begin{bmatrix} u \\ v \\ 1 \end{bmatrix} = \begin{bmatrix} \alpha & 0 & c_x \\ 0 & \beta & c_y \\ 0 & 0 & 1 \end{bmatrix}\begin{bmatrix} x \\ y \\ 1 \end{bmatrix}. \qquad (4)$$

Combining Equations (1), (2), and (4), one can obtain the transformation from the world coordinate system to the pixel coordinate system:

$$p = \begin{bmatrix} u \\ v \\ 1 \end{bmatrix} = \frac{1}{z_c}\begin{bmatrix} \alpha & 0 & c_x \\ 0 & \beta & c_y \\ 0 & 0 & 1 \end{bmatrix}\begin{bmatrix} f & 0 & 0 & 0 \\ 0 & f & 0 & 0 \\ 0 & 0 & 1 & 0 \end{bmatrix}\begin{bmatrix} R & T \\ 0^T & 1 \end{bmatrix}\begin{bmatrix} x_w \\ y_w \\ z_w \\ 1 \end{bmatrix}, \qquad (5a)$$

or, $$p = \begin{bmatrix} u \\ v \\ 1 \end{bmatrix} = \frac{1}{z_c}\begin{bmatrix} f_x & 0 & c_x \\ 0 & f_y & c_y \\ 0 & 0 & 1 \end{bmatrix}\begin{bmatrix} r_{11} & r_{12} & r_{13} & t_x \\ r_{21} & r_{22} & r_{23} & t_y \\ r_{31} & r_{32} & r_{33} & t_z \end{bmatrix}\begin{bmatrix} x_w \\ y_w \\ z_w \\ 1 \end{bmatrix} := \frac{1}{z_c}KHP_w, \qquad (5b)$$

where K is the intrinsic matrix and H is the extrinsic matrix.

In Equation 5(a), rotation matrix R is generated by the Euler angle $\theta=(\theta_x, \theta_y, \theta_z)^t$ and rotated in an order as X-Y-Z, i.e., $$R(\theta) = R_z(\theta_z)R_y(\theta_y)R_x(\theta_x) = \qquad (6)$$

$$\begin{bmatrix} \cos\theta_z & -\sin\theta_z & 0 \\ \sin\theta_z & \cos\theta_z & 0 \\ 0 & 0 & 1 \end{bmatrix}\begin{bmatrix} \cos\theta_y & 0 & \sin\theta_y \\ 0 & 1 & 0 \\ -\sin\theta_y & 0 & \cos\theta_y \end{bmatrix}\begin{bmatrix} 1 & 0 & 0 \\ 0 & \cos\theta_x & -\sin\theta_x \\ 0 & \sin\theta_x & \cos\theta_x \end{bmatrix} =$$

$$\begin{bmatrix} r_{11} & r_{12} & r_{13} \\ r_{21} & r_{22} & r_{23} \\ r_{31} & r_{32} & r_{33} \end{bmatrix}.$$

A real lens typically includes some distortions, which can be categorized into radial distortions and tangent distortions. With distortion, the conversion from the image coordinate system $O_{image}$ to the pixel coordinate system $O_{pixel}$ can be expressed as:

$$\begin{bmatrix} u \\ v \end{bmatrix} = \begin{bmatrix} f_x x' + c_x \\ f_y y' + c_y \end{bmatrix}, \qquad (7)$$

where $f_x$ and $f_y$ correspond to the focal length measured in pixel size $$\left(\text{i.e., } f_x = \frac{f}{dx},\ f_y = \frac{f}{dy}\right),$$

and $$\begin{cases} x' = x(1 + k_1 r^2 + k_2 r^4 + k_3 r^6) + 2p_1 xy + p_2(r^2 + 2x^2) \\ y' = y(1 + k_1 r^2 + k_2 r^4 + k_3 r^6) + 2p_2 xy + p_1(r^2 + 2y^2) \end{cases}. \qquad (8)$$

In addition to the pinhole model shown in FIG. 1, depending on the type of lens, other models can also be used to describe the distortion. For example, the fisheye camera model can also be used to describe distortions of a fisheye camera.

In Equations (8), $k_1$, $k_2$, $k_3$, $p_1$, and $p_2$ are distortion parameters. The distortion parameters along with $f_x$, $f_y$, $c_x$, and $c_y$ form intrinsic parameters of the camera and are usually calibrated by the manufacturer of the camera. Once calibrated, the intrinsic parameters typically remain unchanged through the life of the camera.

Extrinsic parameters of the camera describe the relation between the camera and the world. There are mainly six independent parameters (i.e., $\theta_x$, $\theta_y$, $\theta_z$, $t_x$, $t_y$, $t_z$) that describe the 3D translations (i.e., medial-lateral, vertical, and anterior-posterior) and rotations (i.e., roll, pitch, and yaw) between the camera and the world coordinates. The extrinsic parameters are often calibrated post-manufacturing and may need to be recalibrated after usage.

Given the intrinsic and extrinsic parameters, one can project a 3D world point $P_w=(x_w, y_w, z_w)^t$ onto the image plane as a 2D pixel point $p=(u, v)^t$. Such a process is a dimension reduction process, and the inverse mapping from the 2D space to the 3D space is not a one-to-one mapping. Existing approaches for calibrating the camera extrinsic parameters often involve minimizing the reprojection errors between re-projected pixel coordinates and the measured (or captured) pixel coordinates of a 3D target (e.g., a checkerboard). For example, a captured point on the image plane can be denoted $p_{captured,i}$, and according to Equation (5b) a reprojected point can be computed according to $$\frac{1}{z_{c,i}} KHP_{w,i}.$$

The extrinsic parameter optimization problem can be expressed as a problem of minimizing the reprojection error:

$$\arg\min \sum_i \left\| p_{captued,i} - \frac{1}{z_{c,i}} KHP_{w,i} \right\|_2^2.$$

The above approach to optimizing camera extrinsic parameters by minimizing reprojection errors may not be sufficiently accurate. Note that two different 3D world points far away from the camera may be projected very closely on the pixel plane. Therefore, even very small reprojection errors can lead to a lot of alignment errors in stitch-based applications, such as the bird-eye-view (BEV) application, where the alignment errors can be observed and measured on the ground plane. It also means that the extrinsic parameters optimized in the pixel coordinate system may be less sensitive to distant points. To increase the calibration accuracy, in some embodiments of the instant application, instead of minimizing the reprojection error, the calibration system estimates the camera extrinsic parameters by minimizing the inverse projection (i.e., the projection of pixel points from the pixel coordinate system $O_{pixel}$ to the world coordinate system $O_{world}$) errors. Moreover, instead of a 3D target, the calibration system can use a 2D target positioned on the ground plane (e.g., a checkerboard pattern painted on the ground).

Defining the ground plane as $z_w=0$, one can express the image projection from the ground plane to the pixel plane as:

$$p = \begin{bmatrix} u \\ v \\ 1 \end{bmatrix} = \frac{1}{z_c} \begin{bmatrix} f_x & 0 & c_x \\ 0 & f_y & c_y \\ 0 & 0 & 1 \end{bmatrix} \begin{bmatrix} r_{11} & r_{12} & t_x \\ r_{21} & r_{22} & t_y \\ r_{31} & r_{32} & t_z \end{bmatrix} \begin{bmatrix} x_w \\ y_w \\ 1 \end{bmatrix} = \frac{1}{z_c} KH' P'_w, \quad (9)$$

where $P'_w$ is a point on the ground plane, and H' is the transformation matrix with reduced (i.e., 3×3) dimension.

Because the input and output of the image-projection model of Equation (9) are both in a 2D space (i.e., the ground plane and the pixel plane), the model can be inversed as:

$$P'_w = \begin{bmatrix} x_w \\ y_w \\ 1 \end{bmatrix} = \qquad (10)$$

$$\frac{1}{z_w} \begin{bmatrix} r_{11} & r_{12} & t_x \\ r_{21} & r_{22} & t_y \\ r_{31} & r_{32} & t_z \end{bmatrix}^{-1} \begin{bmatrix} f_x & 0 & c_x \\ 0 & f_y & c_y \\ 0 & 0 & 1 \end{bmatrix}^{-1} \begin{bmatrix} u \\ v \\ 1 \end{bmatrix} = \frac{1}{z_w} H'^{-1} K^{-1} p,$$

where $z_w$ is the third entry of $H'^{-1}K^{-1}p$.
The inverse-projection error measured on the ground plane can be defined as:

$$\sum_i \left\| P'_{w,i} - \frac{1}{z_w} H'^{-1} K^{-1} p_{captured,i} \right\|_2^2. \qquad (11)$$

The inverse-projection error in Formula (11) is related to both the intrinsic matrix K and the 3×3 reduced extrinsic matrix H'. Assuming that the intrinsic matrix K is known, the 3×3 reduced extrinsic matrix H' (i.e., the camera extrinsic parameters) can be optimized by minimizing the inverse-projection error.

The LM Algorithm

Finding extrinsic parameters (i.e., $\theta_x$, $\theta_y$, $\theta_z$, $t_x$, $t_y$, $t_z$) that can minimize the inverse-projection error is essentially a non-linear optimization problem. In some embodiments, the calibration system can implement the Levenberg-Marquardt (LM) algorithm, which is an iterative technique that locates the minimum of a multivariate function expressed as the sum of squares of non-linear real-valued functions.

Let $X=[x_1, x_2, x_3, \ldots, x_n]^t$ be the variable vector, the non-linear optimization problem (e.g., the problem of minimizing expression (11)) can be described as minimizing the error of all the samples $g(X)=[g_1(X), g_2(X), g_3(X), \ldots, g_m(X)]^t$ measured by the Euclidian or L2 norm $$\left( \text{i.e.,} \ G(X) = \frac{1}{2} \|g(X)\|_2^2 = \frac{1}{2} g(X)^T g(X) \right).$$

Like other numeric minimization algorithms, the LM algorithm is an iterative procedure. To start a minimization, an initial estimate of the variable vector is provided (e.g., $X=X_0$). In each iteration step, the variable vector X is replaced by a new estimate $X+\delta$. To determine $\delta$, $g(X)$ can be approximated by its linearization: $g(X) \approx g(X)+J\cdot\delta$, where the Jacobian matrix J is the gradient of $g(X)$ with respect to X.

In the instant application of optimizing the camera extrinsic parameters by minimizing the inverse-projection errors, the variable vectors can be denoted $X=[\theta_x, \theta_y, \theta_z, t_x, t_y, t_z]^t$. According to Equation (6), the extrinsic matrix can be written as:

$$H = \begin{bmatrix} \cos\theta_z \cos\theta_y & -\sin\theta_z \cos\theta_x + \cos\theta_z \sin\theta_y \sin\theta_x & \sin\theta_z \sin\theta_x + \cos\theta_z \sin\theta_y \cos\theta_x & t_x \\ \sin\theta_z \cos\theta_y & \cos\theta_z \cos\theta_x + \sin\theta_z \sin\theta_y \sin\theta_x & -\cos\theta_z \sin\theta_x + \sin\theta_z \sin\theta_y \cos\theta_x & t_y \\ -\sin\theta_y & \cos\theta_y \sin\theta_x & \cos\theta_y \cos\theta_x & t_z \end{bmatrix}. \quad (12)$$

When the calibration target is placed on the ground plane, the extrinsic matrix can be reduced from the above 4×3 dimension to a 3×3 matrix H', which can be referred to as the reduced extrinsic matrix and written as:

$$H' = \begin{bmatrix} \cos\theta_z \cos\theta_y & -\sin\theta_z \cos\theta_x + \cos\theta_z \sin\theta_y \sin\theta_x & t_x \\ \sin\theta_z \cos\theta_y & \cos\theta_z \cos\theta_x + \sin\theta_z \sin\theta_y \sin\theta_x & t_y \\ -\sin\theta_y & \cos\theta_y \sin\theta_x & t_z \end{bmatrix}. \quad (13)$$

The inverse projection (i.e., projection from the image plane to the ground plane) can be written as:

$$\begin{bmatrix} w_x \\ w_y \\ 1 \end{bmatrix} = \frac{1}{w_z} \begin{bmatrix} w_{xx} \\ w_{yy} \\ w_z \end{bmatrix}, \qquad (14)$$

where $[w_x, w_y]^t$ represents the world coordinates of an inversely projected target point on the ground plane, and $$\begin{bmatrix} w_{xx} \\ w_{yy} \\ w_z \end{bmatrix} = (K \cdot H')^{-1} \cdot \begin{bmatrix} u \\ v \\ 1 \end{bmatrix}. \quad (15)$$

Assuming that there are N target points (e.g., feature points of the target) on the ground plane, creating N projections on the image plane, the error vector projecting from the image plane to the ground plane can be defined by function g:

$$g(X) = \begin{bmatrix} w_{x,1} \\ w_{y,1} \\ w_{x,2} \\ w_{y,2} \\ \vdots \\ w_{x,i} \\ w_{y,i} \\ \vdots \\ w_{x,N} \\ w_{y,N} \end{bmatrix} - \begin{bmatrix} w_{xmeasured,1} \\ w_{ymeasured,1} \\ w_{xmeasured,2} \\ w_{ymeasured,2} \\ \vdots \\ w_{xmeasured,i} \\ w_{ymeasured,i} \\ \vdots \\ w_{xmeasured,N} \\ w_{ymeasured,N} \end{bmatrix}. \quad (16)$$

The error measurement can be defined as $$G(X) = \frac{1}{2}\|g(X)\|_2^2 = \frac{1}{2}g(X)^T g(X).$$

The Jacobian matrix can be expressed as:

$$J = \begin{bmatrix} \frac{\partial w_{x,1}}{\partial \theta_x} & \frac{\partial w_{x,1}}{\partial \theta_y} & \frac{\partial w_{x,1}}{\partial \theta_z} & \frac{\partial w_{x,1}}{\partial t_x} & \frac{\partial w_{x,1}}{\partial t_y} & \frac{\partial w_{x,1}}{\partial t_z} \\ \frac{\partial w_{y,1}}{\partial \theta_x} & \frac{\partial w_{y,1}}{\partial \theta_y} & \frac{\partial w_{y,1}}{\partial \theta_z} & \frac{\partial w_{y,1}}{\partial t_x} & \frac{\partial w_{y,1}}{\partial t_y} & \frac{\partial w_{y,1}}{\partial t_z} \\ \frac{\partial w_{x,2}}{\partial \theta_x} & \frac{\partial w_{x,2}}{\partial \theta_y} & \frac{\partial w_{x,2}}{\partial \theta_z} & \frac{\partial w_{x,2}}{\partial t_x} & \frac{\partial w_{x,2}}{\partial t_y} & \frac{\partial w_{x,2}}{\partial t_z} \\ \frac{\partial w_{y,2}}{\partial \theta_x} & \frac{\partial w_{y,2}}{\partial \theta_y} & \frac{\partial w_{y,2}}{\partial \theta_z} & \frac{\partial w_{y,2}}{\partial t_x} & \frac{\partial w_{y,2}}{\partial t_y} & \frac{\partial w_{y,2}}{\partial t_z} \\ & & & \vdots & & \\ \frac{\partial w_{x,i}}{\partial \theta_x} & \frac{\partial w_{x,i}}{\partial \theta_y} & \frac{\partial w_{x,i}}{\partial \theta_z} & \frac{\partial w_{x,i}}{\partial t_x} & \frac{\partial w_{x,i}}{\partial t_y} & \frac{\partial w_{x,i}}{\partial t_z} \\ \frac{\partial w_{y,i}}{\partial \theta_x} & \frac{\partial w_{y,i}}{\partial \theta_y} & \frac{\partial w_{y,i}}{\partial \theta_z} & \frac{\partial w_{y,i}}{\partial t_x} & \frac{\partial w_{y,i}}{\partial t_y} & \frac{\partial w_{y,i}}{\partial t_z} \\ & & & \vdots & & \\ \frac{\partial w_{x,N}}{\partial \theta_x} & \frac{\partial w_{x,N}}{\partial \theta_y} & \frac{\partial w_{x,N}}{\partial \theta_z} & \frac{\partial w_{x,N}}{\partial t_x} & \frac{\partial w_{x,N}}{\partial t_y} & \frac{\partial w_{x,N}}{\partial t_z} \\ \frac{\partial w_{y,N}}{\partial \theta_x} & \frac{\partial w_{y,N}}{\partial \theta_y} & \frac{\partial w_{y,N}}{\partial \theta_z} & \frac{\partial w_{y,N}}{\partial t_x} & \frac{\partial w_{y,N}}{\partial t_y} & \frac{\partial w_{y,N}}{\partial t_z} \end{bmatrix} \quad (17)$$

Given the Jacobian matrix shown in Equation (17), the solution to the optimization problem $$\underset{X}{\mathrm{argming}}(X)$$

can be solved using the LM algorithm shown below:

Levenberg–Marquardt Algorithm for non-linear optimization $\underset{X}{\mathrm{argming}}(X)$ Begin
k = 0, v = 2, X = $X_0$ Levenberg–Marquardt Algorithm for non-linear optimization $\underset{X}{\mathrm{argming}}(X)$ $A = J^T(X)J(X)$, $B = J^T(X)g(X)$
found = ($\|B\|_\infty \le \varepsilon_1$), $\mu = \tau \cdot \max\{J^T(X)J(X)\}$
While (not found) and (k < $k_{max}$)
   k = k + 1, Solve (A + $\mu$I)h* = $-J^T(X)g(X)$
   If $\|h*\| \le \varepsilon_2(\|X\| + \varepsilon_2)$
     found = true
   Else
     $X_{new} = X + h*$ $$L(0) - L(h^*) = \frac{1}{2}(h^*)^T(\mu h^* - J^T(X)g(X))$$

$\varrho = (G(X) - G(X_{new}))/(L(0) - L(h*))$
     If $\varrho > 0$
        X = $X_{new}$
        $A = J^T(X)J(X)$, $B = J^T(X)g(X)$ found = ($\|B\|_\infty \le \varepsilon_1$), $\mu = \mu \cdot \max\left\{\frac{1}{3}, 1 - (2\varrho - 1)^3\right\}$, v = 2

Else
        $\mu = \mu \cdot v$, v = 2v
end

As discussed previously, the LM algorithm starts with a reasonable initial estimate $X = X_0$ and then iteratively finds the solution to the optimization problem. Such an initial estimate may come from the installation design of the camera or some other sketch calculation. In some embodiments, the initial estimate can be found based on a subset of feature points with known coordinates.

Recalling Equation (9), points in the image plane can be the projections of points in the ground plane $$\left(\text{i.e., } p = \frac{1}{z_c} K H' P'_w\right).$$

It is assumed that the intrinsic parameters (thus the intrinsic matrix K) are known or pre-calibrated. Given p, $P'_w$, and K, one can employ a Direct Linear Transform (DLT) technique to find an estimation of H'.

Note that H' is essentially a homography matrix, meaning that H' and $\alpha \cdot$H' should be the same matrix in the sense of homography. Moreover, although the reduced extrinsic matrix H' should have the form from the rotation matrix R and the translation vector T as expressed in Equation (13), due to model accuracy, parameter perturbation, computation accuracy, and measurement accuracy, H' may differ from the theoretical form.

The initial estimation of H' can be denoted $$H' = [h_1, h_2, h_3] = \begin{bmatrix} h'_{11} & h'_{12} & h'_{13} \\ h'_{21} & h'_{22} & h'_{23} \\ h'_{31} & h'_{32} & h'_{33} \end{bmatrix}.$$

According to Equation (13), five or more points may be needed to find the inverse mapping between p and $P'_w$.

The homography nature means that components in the initial estimation of H' may not be the same as those shown in Equation (13). To obtain the estimated values of $\theta_x$, $\theta_y$, $\theta_z$, $t_x$, $t_y$, $t_z$, a number of constraints should be applied to the initial estimate of H'. One constraint is associated with the direction (i.e., the sign) of the camera. Considering that the translation vector $T=[t_x\ t_y\ t_z]^t$ is exactly the coordinate of the origin of the world coordinate system $O_{world}$, measured in the pixel coordinate system $O_{pixel}$, generally $t_y>0$ if the camera is mounted with its y axis almost pointing downward to the ground, as shown in FIG. 1. Therefore, if $h''_{23}<0$ (or if some other necessary condition is destroyed for special installation design), then the sign of the matrix should be reversed (i.e., H':=−H').

The other constraint on the various components in H' is the normalization constraint. According to the theoretical form (i.e., Equation (13)) of the extrinsic matrix, the first and second column of H' are normal to each other, both with unit length. One can normalize the last column of H' by the geometric mean length of the first two columns and then normalize the first two columns respectively, i.e., $$h_3 := \frac{h_3}{\sqrt{\|h_1\|\|h_2\|}};$$

$$h_1 := \frac{h_1}{\|h_1\|}; h_2 := \frac{h_2}{\|h_2\|}.$$

After normalization, the translation vector can be initialized as $T_0=[t_{x0}\ t_{y0}\ t_{z0}]^t:=h_3$.

To initialize the rotation, one can recover the full rotation matrix from the first two columns of normalized H'. More specifically, one can define $r_1=h_1$, $$r_2 = h_2, r_3 = \frac{r_1 \times r_2}{\|r_1 \times r_2\|}.$$

The full rotation matrix can be defined as $$R' = [r_1, r_2, r_3] = \begin{bmatrix} r_{11} & r_{12} & r_{13} \\ r_{21} & r_{22} & r_{23} \\ r_{31} & r_{32} & r_{33} \end{bmatrix}.$$

The rotation vector $\theta=[\theta_{x0},\ \theta_{y0},\ \theta_{z0}]^t$ can then be initialized as $\theta_{x0}=a\tan 2(r_{32}, r_{33})$, $$\theta_{y0} = a\tan 2\left(-r_{31}, \sqrt{r_{32}^2 + r_{33}^2}\right),$$

$\theta_{z0}=a\tan 2(r_{21}, r_{11})$. The initial estimate of the extrinsic parameters can be $X_0:=[\theta_{x0},\ \theta_{y0},\ \theta_{z0},\ t_{x0},\ t_{y0},\ t_{z0}]^t$.

Figure 2:
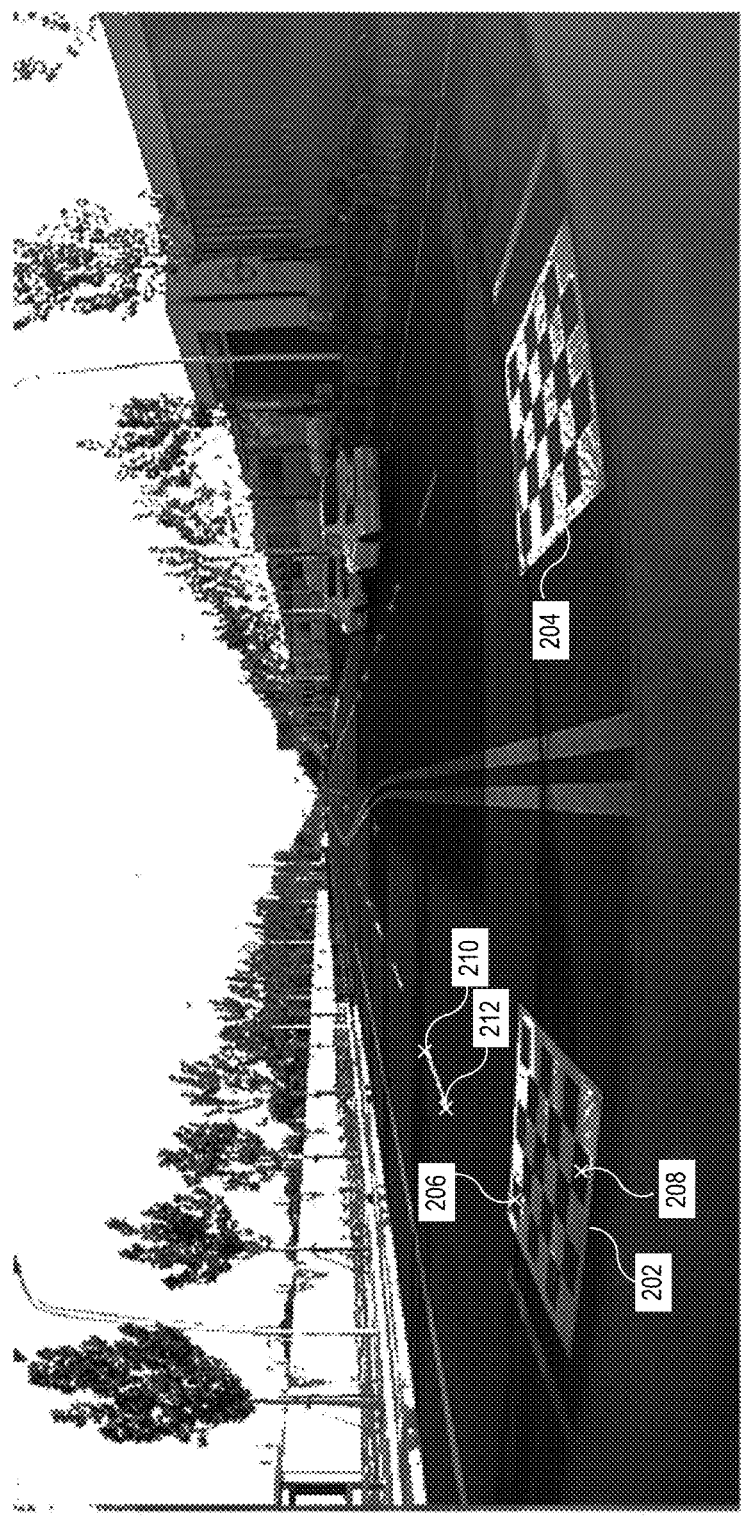
FIG. 2 illustrates exemplary feature points on the ground plane, according to one embodiment of the instant application.

FIG. 2 illustrates exemplary feature points on the ground plane, according to one embodiment of the instant application. More specifically, FIG. 2 shows an image captured by the on-vehicle camera. The captured image shows checkerboard patterns 202 and 204, which can be painted on or attached to the ground. FIG. 2 also shows a number of feature points (e.g., points 206 and 208) included in checkerboard 202. Such feature points can be the corner points of the black or white squares on the checkerboard.

In addition to corner points on the checkerboard, one can also select other distinctive points from the image as feature points. In this example, endpoints of broken lane lines (e.g., points 210 and 212) can also be selected as feature points. For each selected feature point on the image plane, the exact physical location of a corresponding feature point on the ground plane can be measured. According to some embodiments, the homography matrix between the image plane and the ground plane can be estimated based on the mapping between the feature points in the image plane and the corresponding feature points in the ground plane. As discussed previously, the feature points used to estimate the homography matrix can be a subset of the feature points used to calibrate (i.e., optimize) the extrinsic parameters. A sufficient number (e.g., five or more) of feature points are needed to estimate the homography matrix H'.

As discussed previously, the estimation of the homography matrix H' can be used to determine an initial estimate of the camera extrinsic parameters (i.e., $X_0:=[\theta_{x0},\ \theta_{y0},\ \theta_{z0},\ t_{x0}, t_{y0},\ t_{z0}]^t$). In some embodiments, one can first apply the direction constraint to ensure that the direction of the homography matrix H' is consistent with the mounting direction of the camera (which typically is above the ground plane). Parameters in the homography matrix H' can also be normalized to eliminate the scalar factor. The optimized camera extrinsic parameters can then be obtained by minimizing the inverse-projection error from the image plane to the ground plane. In some embodiments, optimizing the camera extrinsic parameters can involve applying the LM algorithm.

Figure 3:
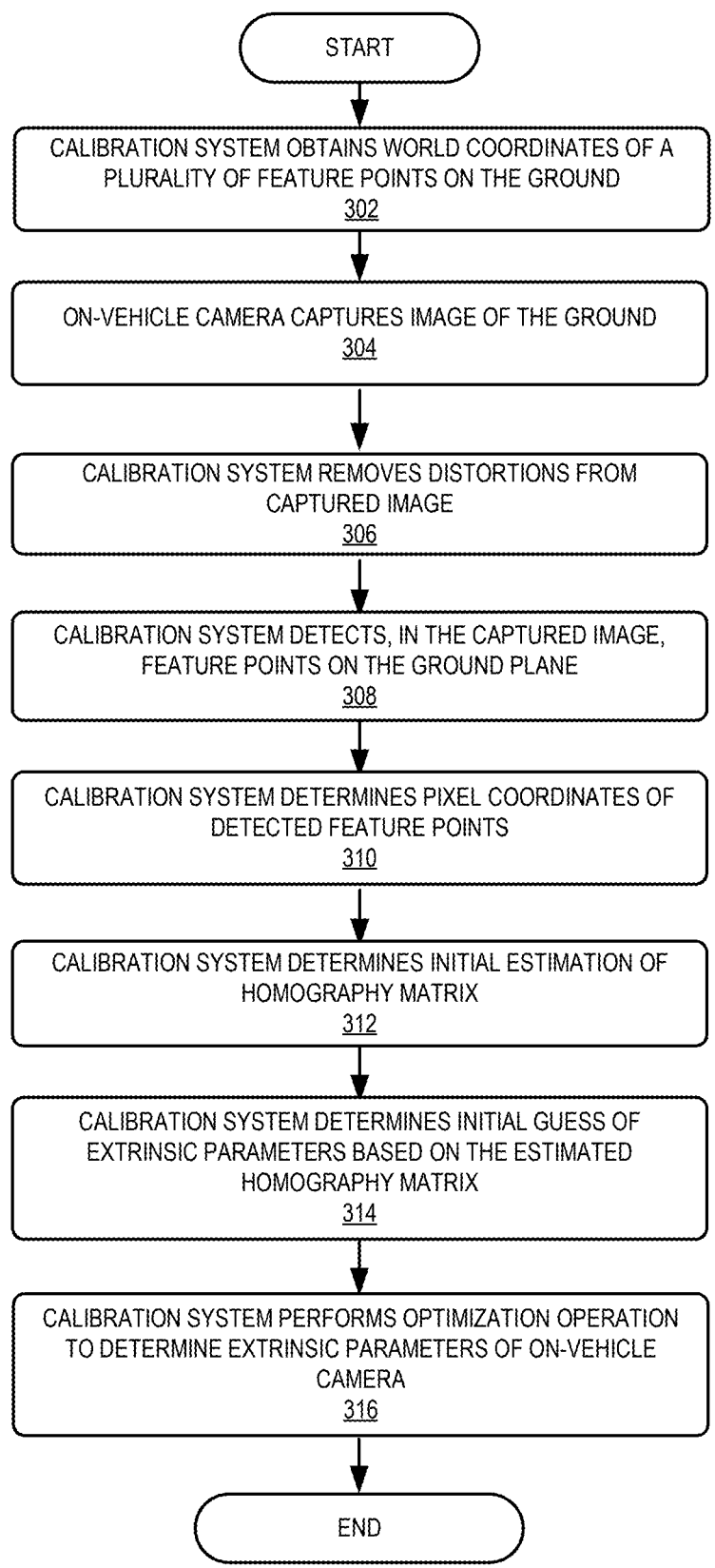
FIG. 3 presents a flowchart illustrating an exemplary process for calibrating the extrinsic parameters of an on-vehicle camera, according to one embodiment of the instant application.

FIG. 3 presents a flowchart illustrating an exemplary process for calibrating the extrinsic parameters of an on-vehicle camera, according to one embodiment of the instant application. In one or more embodiments, one or more of the steps in FIG. 3 may be repeated and/or performed in a different order. Accordingly, the specific arrangement of steps shown in FIG. 3 should not be construed as limiting the scope of the technique.

During operation, the calibration system can obtain the world coordinates of a plurality of feature points on the ground (operation 302). The feature points can include distinctive points on a specially designed target (e.g., a checkerboard pattern) on the ground. In one example, the target can be a pattern with a large number of distinctive feature points painted on the ground. In addition to points on the target, the feature points can also include distinctive points of pavement markings. In one example, the feature points can include endpoints of broken lane lines. Measurement can be performed on the feature points to determine their precise coordinates in a predetermined world coordinate system. In one embodiment, for simplicity, the origin of the world coordinate system can be on the ground plane such that z=0 for all feature points on the ground plane.

The to-be-calibrated on-vehicle camera can capture an image of the ground (operation 304). More specifically, the captured portion of the ground can include the feature points with known physical locations. As shown in FIG. 2, the captured image can include the specially designed targets (e.g., targets 202 and 204) and the pavement markings.

The calibration system can remove distortions from the captured image (operation 306). In some embodiments, the calibration system can first perform calibration of the intrinsic parameters of the on-vehicle camera and then remove the distortions based on the calibrated internal parameters. In alternative embodiments, the intrinsic parameters were calibrated by the camera manufacturer, which provides the calibrated intrinsic parameters to the calibration system.

The calibration system can detect, in the captured image, a number of feature points (operation 308). These feature points can correspond to feature points on the ground with known world coordinates. Various feature-detection techniques can be used to detect the feature points. The calibration system can further determine the pixel coordinates of the detected feature points in the image (operation 310). To improve the calibration accuracy, the ground used for calibration should include a large number (e.g., tens or hundreds) of distinctive feature points.

The calibration system can estimate the homography matrix between the ground plane and the pixel plane (operation 312). More specifically, the homography matrix can be estimated based on the corresponding relationship between a small subset of the feature points. The calibration system can select a few feature points and estimate the homography matrix based on the world coordinates of the selected feature points in the ground plane and the pixel coordinates of the corresponding feature points in the image plane. In some embodiments, at least five feature points can be used to estimate the homography matrix. In one embodiment, the DLT technique can be used to estimate the homography matrix by solving Equation (9).

The calibration system can determine an initial estimate of the extrinsic parameters based on the estimated homography matrix (operation 314). In some embodiments, determining the initial estimate of the extrinsic parameters can involve converting the estimated homography matrix to the extrinsic matrix (as defined in Equation (12)) by applying the camera direction constraint and the normalization constraint. Applying the camera direction constraint can involve determining the direction (e.g., whether to reverse the sign) of the estimated homography matrix. In one example, if $$h'_{23}$$

in the estimated homography matrix is negative, the entire matrix should be multiplied by −1 to ensure that the camera direction condition $t_y>0$ remains true as the camera is always mounted above the ground plane. Applying the normalization constraint can involve normalizing the columns of the estimated homography matrix.

Subsequent to obtaining the initial estimate of the extrinsic parameters, the calibration system can perform an optimization operation to determine the calibrated extrinsic parameters of the on-vehicle camera (operation 316). In some embodiments, the calibration system can apply an LM technique to determine extrinsic parameters that can minimize the inverse-projection error of the detected feature points in the image. For example, for each detected image feature point, the calibration system can project it (based on the current estimate of the extrinsic parameters) to the ground plane and measure the distance between the projected point and a corresponding feature point on the ground plane. Such a distance is referred to as the inverse-projection error of that feature point. An error vector can be assembled to include the inverse-projection error of all detected feature points, with each component being the inverse-projection error of one feature point in the image. The calibration system can further compute the L2 norm of the error vector and update the estimation of the extrinsic parameters to reduce the L2 norm of the error vector. The extrinsic parameters of the on-vehicle camera can be obtained by minimizing the L2 norm of the error vector.

In the example shown in FIG. 3, distortions are removed from the captured image before the feature points are detected. In alternative embodiments, it is also possible that the calibration system detects the feature points in the distorted image. The removal of the distortion effect can be applied to the detected feature points according to Equations (8) (i.e., by multiplying the distortion coefficients).

Once the on-vehicle camera is calibrated, the vehicle can be deployed. While the vehicle is in operation, the on-vehicle camera can capture images of the environment. The advanced driver-assistance system (ADAS) or automated driving system (ADS) installed on the vehicle can determine the accurate physical positions of objects (e.g., other vehicles or pedestrians) in the environment based on the captured images and the calibrated camera parameters, including both the intrinsic and extrinsic parameters.

Self-Inspection

While the vehicle is in motion, the on-vehicle camera may shift or rotate slightly due to rough road conditions or changes in environmental temperature. In such a situation, the previously calibrated extrinsic parameters may not be accurate enough to determine the physical positions of objects in images, which can lead to detection errors. Generally speaking, the rotation parameters (i.e., $\theta_x$, $\theta_y$, $\theta_z$) are more likely to be altered, whereas the translation parameters (i.e., $t_x$, $t_y$, $t_z$) are typically unchanged. To prevent detection errors, it is important that the camera calibration system can perform self-inspection to detect deviation of the camera extrinsic parameters from the calibrated values, such that recalibration can be timely performed.

In some embodiments, the calibration system can perform self-inspection by collecting statistics about vanishing points observed in captured images. More specifically, distances between the observed vanishing points and a vanishing line calculated based on the previously calibrated camera parameters can be determined and statistics about those distances can be gathered. A significant deviation of the observed vanishing points from the calculated vanishing line can indicate a deviation of the previously calibrated camera parameters from their actual values.

Assuming a world coordinate system $O_{world}$ with its origin on the ground, its $X_w$-axis pointing to the right of the vehicle, its $Y_w$-axis pointing forward, and its $Z_w$-axis pointing upward, a lane line (which can be roughly along the forward-backward direction or the $Y_w$-axis) on the ground can be represented as: $X_w = aY_w + x_0$, $Z_w = 0$, $-\infty < a < +\infty$. When a point $[x_w, y_w, z_w = 0]^t$ on the lane line is projected onto the pixel plane of the camera, the pixel coordinates of the projected point can be expressed as:

$$\begin{cases} u = c_x + f_x \dfrac{r_{11}x_w + r_{12}y_w + t_x}{r_{31}x_w + r_{32}y_w + t_z} \\ v = c_y + f_y \dfrac{r_{21}x_w + r_{22}y_w + t_y}{r_{31}x_w + r_{32}y_w + t_z} \end{cases}. \qquad (18)$$

Assuming that the lane line is a straight line (i.e., $X_w = aY_w + x_0$, $Z_w = 0$), Equation (18) can be rewritten by replacing $x_w$ with $ay_w + x_0$:

$$\begin{cases} u = c_x + f_x \dfrac{(ar_{11} + r_{12})y_w + r_{11}x_0 + t_x}{(ar_{31} + r_{32})y_w + r_{31}x_0 + t_z} \\ v = c_y + f_y \dfrac{(ar_{21} + r_{22})y_w + r_{21}x_0 + t_y}{(ar_{31} + r_{32})y_w + r_{31}x_0 + t_z} \end{cases}. \qquad (19)$$

When $y_w \to \infty$, the lane line converges at:

$$\begin{cases} u_{y_w \to \infty} = c_x + f_x \dfrac{ar_{11} + r_{12}}{ar_{31} + r_{32}} \\ v_{y_w \to \infty} = c_y + f_y \dfrac{ar_{21} + r_{22}}{ar_{31} + r_{32}} \end{cases}. \qquad (20)$$

According to Equation (20), the converging point of the lane line is a function of the slope a but is independent of the offset $x_0$. Such a point is referred to as the vanishing point of a set of parallel lines. When slope a varies from $-\infty$ to $+\infty$, the vanishing points of lines on the ground plane with different slopes can form a straight line on the pixel plane, referred to as a vanishing line of the ground plane (i.e., all lines on the ground plane, regardless of slopes, can converge to the vanishing line on the image/pixel plane). Given the extrinsic parameters of a camera, the vanishing line for the ground plane can be calculated by the following equation:

$$f_y\left(\frac{r_{21}+r_{22}}{r_{31}+r_{32}}-\frac{r_{22}}{r_{32}}\right)(u-c_x)-f_x\left(\frac{r_{11}+r_{12}}{r_{31}+r_{32}}-\frac{r_{12}}{r_{32}}\right)(v-c_y)- \quad (21)$$
$$f_x f_y\left[\frac{r_{12}}{r_{32}}\left(\frac{r_{21}+r_{22}}{r_{31}+r_{32}}-\frac{r_{22}}{r_{32}}\right)-\frac{r_{22}}{r_{32}}\left(\frac{r_{11}+r_{12}}{r_{31}+r_{32}}-\frac{r_{12}}{r_{32}}\right)\right]=0.$$

When a vehicle is in motion (e.g., being driven on a street or highway), lane lines observed by the on-vehicle camera are generally parallel to each other. Accordingly, the lane lines in an image frame captured by the camera can converge to a single vanishing point. After the vehicle changes its direction (e.g., making a left or right turn), the lane lines observed by the on-vehicle camera may converge to a different vanishing point. As long as the physical location and orientation of the camera remain the same with respect to the ground plane (i.e., the camera's extrinsic parameters remain unchanged), lane lines in different image frames should converge to a single vanishing line, which can be calculated based on the camera's extrinsic parameters, as indicated by Equation (21). Therefore, by checking whether the vanishing points of the different image frames fall on the vanishing line calculated based on the previously calibrated extrinsic parameters, one can determine whether the previously calibrated extrinsic parameters deviate from their actual values. If a deviation is observed, the calibration system can notify the user that camera recalibration is needed.

Figure 4:
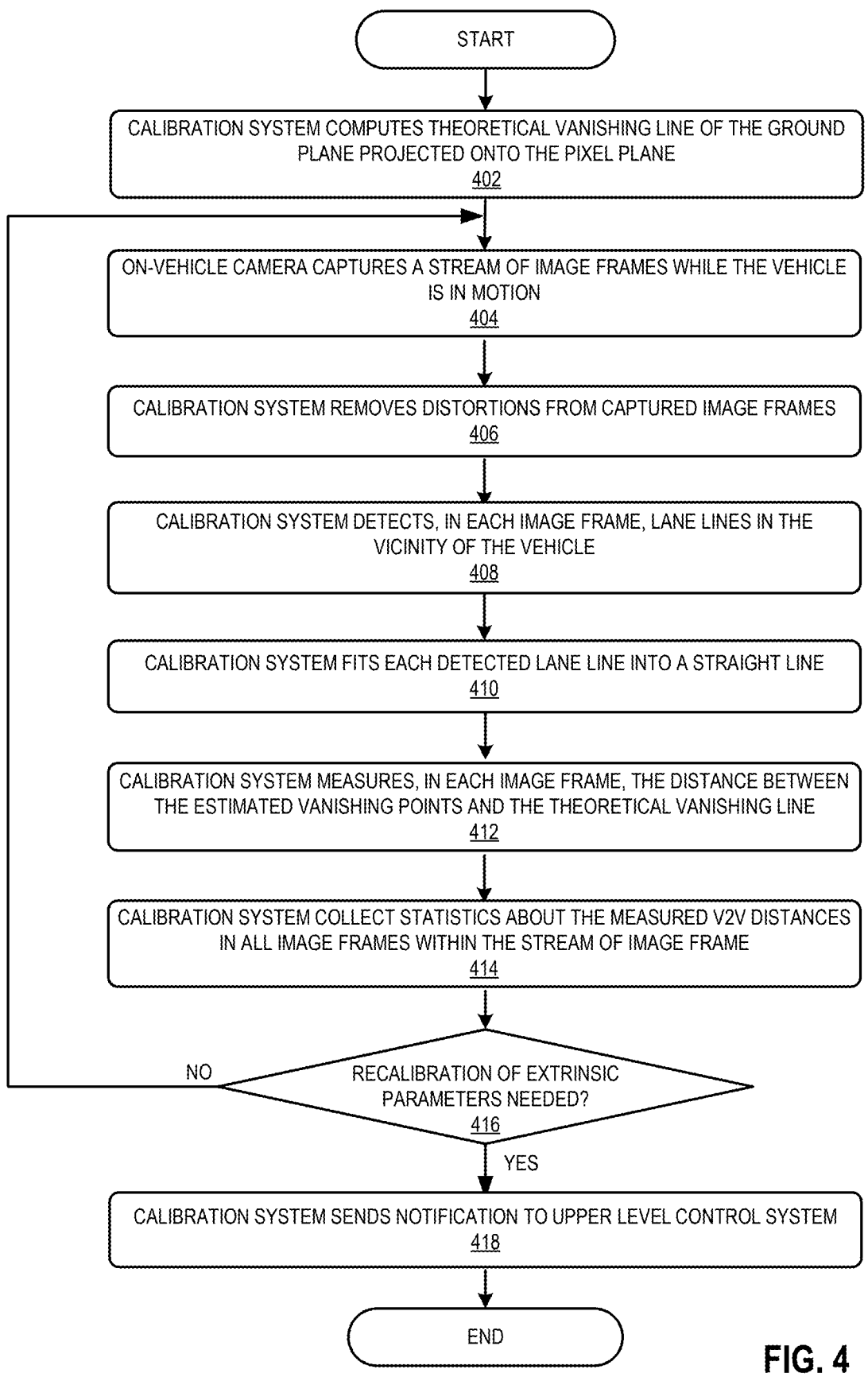
FIG. 4 presents a flowchart illustrating an exemplary process for performing self-inspection on an on-vehicle camera, according to one embodiment of the instant application.

FIG. 4 presents a flowchart illustrating an exemplary process for performing self-inspection on an on-vehicle camera, according to one embodiment of the instant application. In one or more embodiments, one or more of the steps in FIG. 4 may be repeated and/or performed in a different order. Accordingly, the specific arrangement of steps shown in FIG. 4 should not be construed as limiting the scope of the technique.

During operation, the calibration system can compute a theoretical vanishing line of the ground plane projected onto the pixel plane (operation 402). In some embodiments, the theoretical vanishing line can be computed based on previously calibrated camera extrinsic parameters according to Equation (21). Note that it is assumed that the vanishing line is projected onto the undistorted pixel plane.

While the vehicle is in motion, the on-vehicle camera can capture a stream of image frames, with each image frame comprising at least a portion of the ground (operation 404). In most situations, the ground can include pavement markings, such as lane lines. The calibration system can remove distortions from the image frames (operation 406). For example, the distortions can be removed based on known distortion coefficients (e.g., according to Equations (8)).

For each image frame, the calibration system can detect lane lines in the vicinity of the vehicle (operation 408). These lane lines can be assumed to be parallel to each other. Lines far away from the vehicle can be ignored, as they may not belong to the same cluster of parallel lines. Various object-detection mechanisms can be used to detect the lane lines. In one example, a deep-learning neural network can be trained to detect lane lines in each image frame. Note that the detected lane lines may include solid lines as well as broken lines. In addition to lane lines, other traffic structures that are straight and can extend to infinity (e.g., curbsides or center dividers) can also be detected.

The calibration system can fit each detected lane line into a straight line (operation 410). In some embodiments, an image can include K parallel lane lines (or K parallel line segments), and each lane line can be fitted into a straight line as: $a_k u + b_k v + c_k = 0$, $a_k^2 + b_k^2 = 1$, $k=1, 2, \ldots K$. The calibration system can then determine the vanishing point of the lane lines in each image frame (operation 412). In some embodiments, determining the vanishing point of a cluster of parallel lines can involve searching for a point with a minimal sum of squared distances to every line. In one example, the vanishing point $(u_0, v_0)$ of K parallel lines can be determined according to:

$$(u_0, v_0) = \mathrm{argmin}_{u,v} \sum_{k=1}^{K} \frac{(a_k u + b_k v + c_k)^2}{a_k^2 + b_k^2} \quad (22)$$
$$= \mathrm{argmin}_{u,v} \sum_{k=1}^{K} (a_k u + b_k v + c_k)^2$$
$$= -\begin{bmatrix} \sum_{k=1}^{K} a_k^2 & \sum_{k=1}^{K} a_k b_k \\ \sum_{k=1}^{K} a_k b_k & \sum_{k=1}^{K} b_k^2 \end{bmatrix}^{-1} \begin{bmatrix} \sum_{k=1}^{K} a_k c_k \\ \sum_{k=1}^{K} b_k c_k \end{bmatrix}$$

Various optimization techniques can be used to search for the optimal estimation of the vanishing point. In some embodiments, a random sample consensus (RANSAC) technique can be used to estimate the vanishing point by removing outliers.

The calibration system can measure, in each image frame, the distance between the estimated vanishing point and the theoretical vanishing line (operation 412). The distance from the vanishing point to the vanishing line can be referred to as a V2V distance. In some embodiments, the V2V distance can be computed based on:

$$D_{V2V} = \frac{\left| f_y\left(\frac{r_{21}+r_{22}}{r_{31}+r_{32}}-\frac{r_{22}}{r_{32}}\right)(u_0-c_x)-f_x\left(\frac{r_{11}+r_{12}}{r_{31}+r_{32}}-\frac{r_{12}}{r_{32}}\right)(v_0-c_y)-f_x f_y\left[\frac{r_{12}}{r_{32}}\left(\frac{r_{21}+r_{22}}{r_{31}+r_{32}}-\frac{r_{22}}{r_{32}}\right)-\frac{r_{22}}{r_{32}}\left(\frac{r_{11}+r_{12}}{r_{31}+r_{32}}-\frac{r_{12}}{r_{32}}\right)\right]\right|}{\sqrt{f_y^2\left(\frac{r_{21}+r_{22}}{r_{31}+r_{32}}-\frac{r_{22}}{r_{32}}\right)^2-f_x^2\left(\frac{r_{11}+r_{12}}{r_{31}+r_{32}}-\frac{r_{12}}{r_{32}}\right)^2}}. \quad (23)$$

The calibration system can further collect statistics about the measured V2V distances in all image frames within the stream of image frames (operation 414). In some embodiments, the statistics can include the distribution of the V2V distances. If the deviation between the pre-calibrated extrinsic parameters and the actual extrinsic parameters is negligible, the V2V distance should be close to zero in most image frames. On the other hand, if the pose (i.e., location and orientation) of the camera is altered after calibration, the V2V distance may be greater than zero in many image frames.

Figure 5:
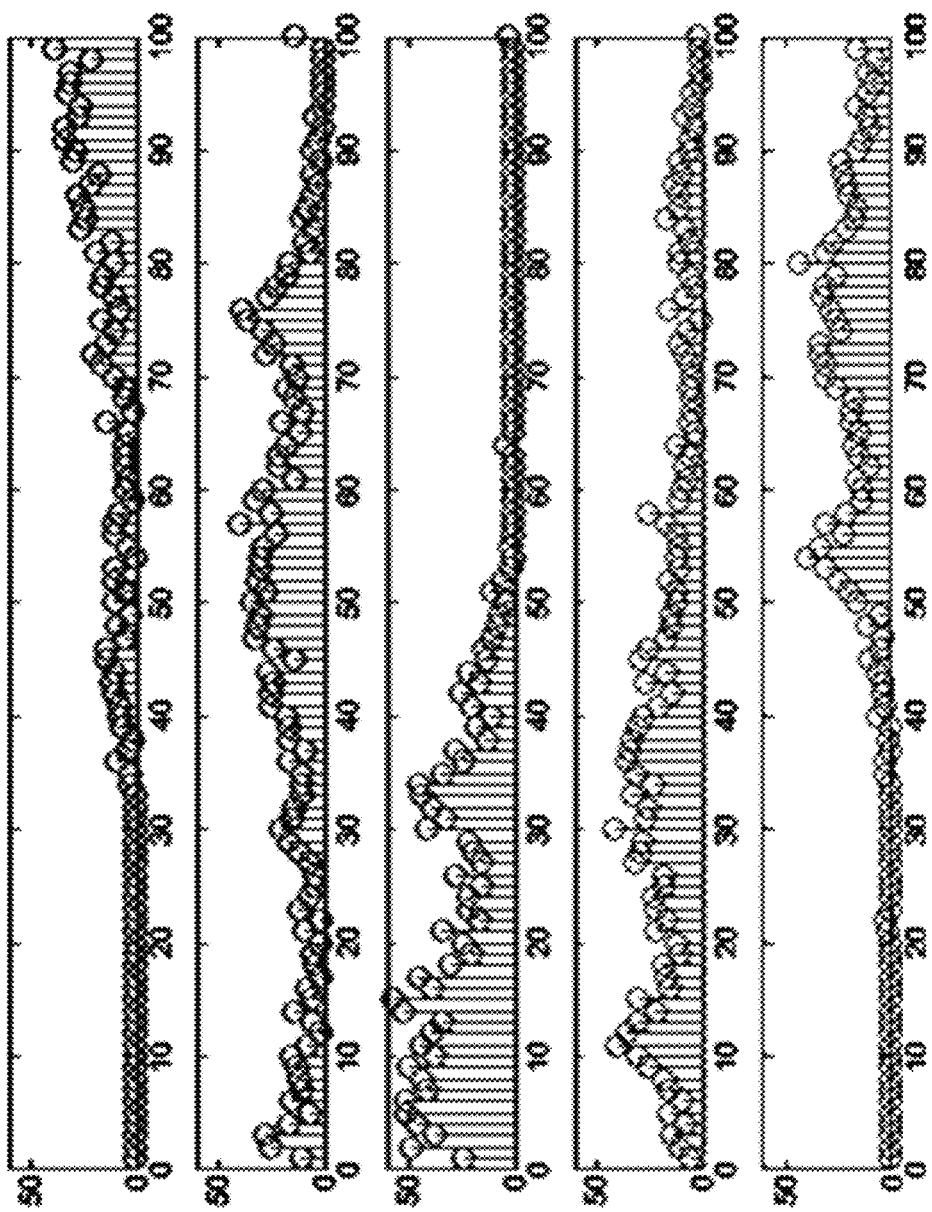
FIG. 5 illustrates an exemplary distribution of the distance between the vanishing point and the theoretical vanishing line, according to one embodiment of the instant application.

FIG. 5 illustrates an exemplary distribution of the distance between the vanishing point and the theoretical vanishing line, according to one embodiment of the instant application. More specifically, FIG. 5 shows the histogram of the V2V distance, with the horizontal axis corresponding to the V2V distance and the vertical axis corresponding to the frequency (i.e., the number of frames associated with each V2V distance). In this example, starting from the top row to the bottom row, the camera's pose has been altered over both yaw (i.e., $\theta_z$) and pitch (i.e., $\theta_y$) by an angle of −2°, −1°, 0°, +1°, +2°, respectively.

As shown in FIG. 5, when there is no change in the camera's pose (the center row), smaller (or close to zero) V2V distances can have a higher count than larger distances (e.g., greater than 50). On the other hand, as the change in the camera's pose becomes larger (e.g., the top or bottom row), the number of image frames with larger V2V distances increases.

Returning to FIG. 4, the calibration system can subsequently determine, based on the collected statistics about the V2V distances, whether recalibration of the camera's extrinsic parameters is needed (operation 416). If so, the calibration system can send a notification to the upper layer control system (e.g., the ADAS or ADS) (operation 418). Otherwise, the calibration system can continue to monitor the camera as the camera captures more images (operation 404). In some embodiments, statistics about the V2V distance collected from a plurality of image frames can be compared with one or more predetermined recalibration criteria. An exemplary recalibration criterion can be based on the number of image frames with larger V2V distances. The recalibration criterion can be met if such a number exceeds a predetermined value. Another criterion can be the average value of the V2V distances in all image frames. The recalibration criterion can be met if the averaged V2V distance exceeds a predetermined value. When a recalibration criterion is met, the calibration system can notify the user that recalibration of the camera extrinsic parameters is needed. In response to the notification, the user may drive the vehicle to a calibration site with known targets to recalibrate the extrinsic parameters of the camera, e.g., the site shown in FIG. 2.

In some embodiments, the self-inspection operation shown in FIG. 4 can be performed by the calibration system periodically according to a predetermined schedule (e.g., once a day or once a week). In alternative embodiments, the calibration system can self-inspect the camera continuously while the vehicle is in motion and the camera is capturing images. More specifically, a sliding window of a predetermined size can be applied to the captured images, and the calibration system can perform self-inspection based on images within each window, which can include between a few hundred and a few thousand images. In some embodiments, the self-inspection operation can be triggered. For example, the calibration system may perform a self-inspection operation each time the vehicle starts. Alternatively, the user can input a command, causing the calibration system to perform the self-inspection operation. In the example shown in FIG. 5, the self-inspection operation is performed on a single on-vehicle camera. In practice, the same calibration system can perform self-inspection operations on multiple cameras. In one example, the calibration system can simultaneously inspect multiple cameras using parallel processing. In another example, the calibration system can inspect the cameras one by one.

Apparatus and Computer System

Figure 6:
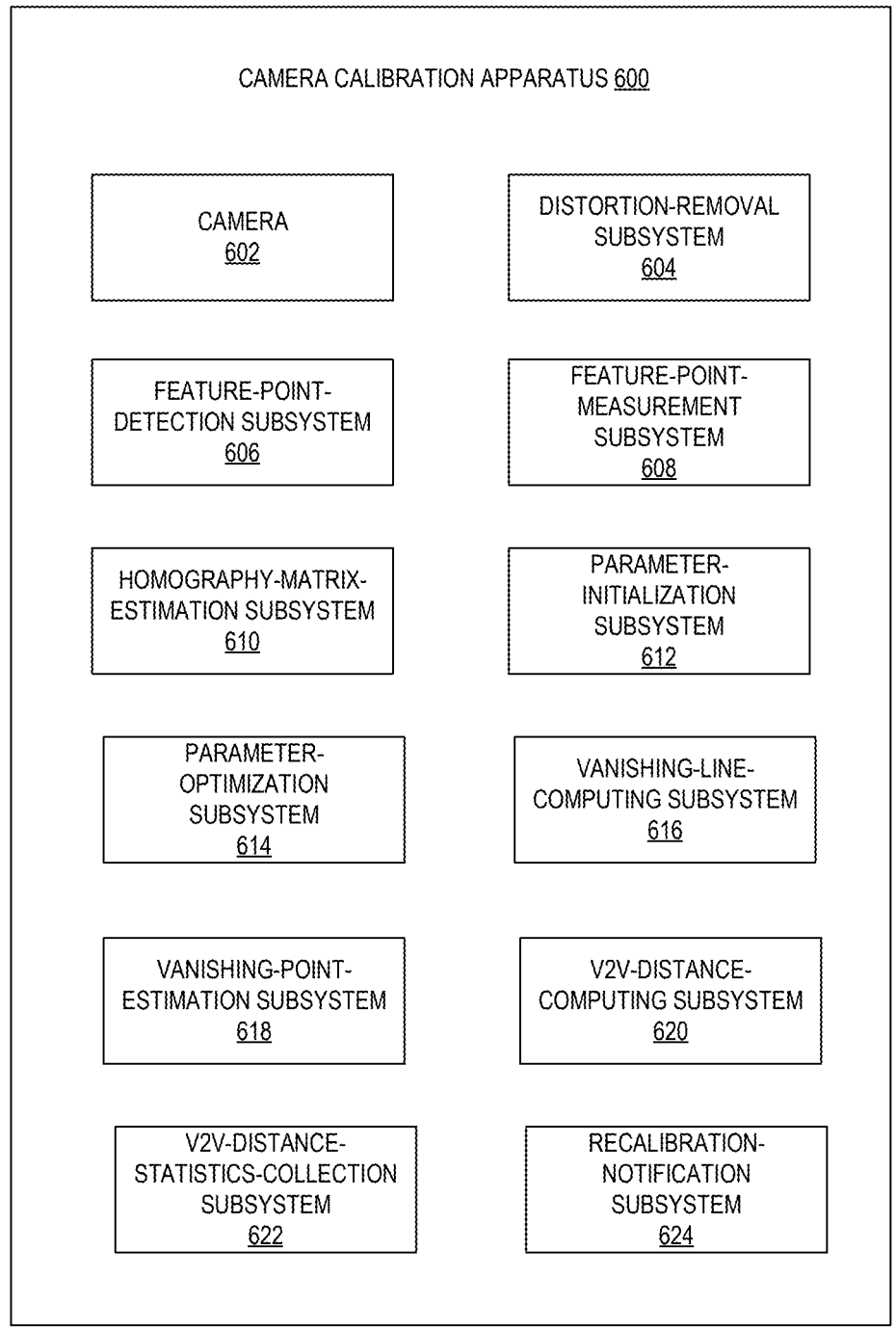
FIG. 6 illustrates an exemplary camera calibration apparatus, according to one embodiment of the instant application.

FIG. 6 illustrates an exemplary camera calibration apparatus, according to one embodiment of the instant application. In FIG. 6, a camera calibration apparatus 600 can include a camera 602, a distortion-removal subsystem 604, a feature-point-detection subsystem 606, a feature-point-measurement subsystem 608, a homography-matrix-estimation subsystem 610, a parameter-initialization subsystem 612, a parameter-optimization subsystem 614, a vanishing-line-computing subsystem 616, a vanishing-point-estimation subsystem 618, a V2V-distance-computing subsystem 620, a V2V-distance-statistics-collection subsystem 622, and a recalibration-notification subsystem 624. The various subsystems in camera-calibration apparatus 600 can be implemented using hardware, software, or a combination thereof.

Camera 602 can be an on-vehicle camera used for autonomous driving applications. Camera 602 can include a visible light camera or an infrared (IR) camera. More specifically, the pose of camera 602 with respect to the vehicle can be fixed. Camera 602 can capture images of the environment while the vehicle is parked or in motion. In some embodiments, while the vehicle is parked (e.g., at a particular calibration site), camera 602 can capture images of the vehicle's surroundings, including the ground. In one example, the calibration site can include one or more specially designed targets (e.g., checkerboards) positioned on the ground plane, and camera 602 can take images of these targets. The targets can include distinctive feature points (e.g., corners), and the exact physical locations of these distinctive feature points can be measured and recorded. In addition to the calibration site, the vehicle can also park at an arbitrary location to perform the calibration operation, as long as the physical locations of a number of distinctive feature points on the ground can be measured accurately. Exemplary feature points can include endpoints of lane line segments.

Distortion-removal subsystem 604 can remove distortions from the captured images. In most cases, the intrinsic parameters, which include the distortion coefficients, have been calibrated and provided by the camera manufacturer. Distortion-removal subsystem 604 can remove the distortions according to the calibrated intrinsic parameters.

Feature-point-detection subsystem 606 can detect distinctive feature points within a captured image. The distinctive feature points in the image correspond to feature points with known physical locations on the ground. Feature-point-measurement subsystem 608 can be responsible for determining or measuring the pixel coordinates of the detected feature points in the image.

Homography-matrix-estimation subsystem 610 can estimate a homography matrix between the pixel plane and the ground plane. More specifically, such a matrix can be used to compute the projection of points from the ground plane to the pixel plane. In some embodiments, homography-matrix-estimation subsystem 610 can estimate the homography matrix based on multiple (e.g., five or more) feature points on the ground plane projected onto the pixel plane. In one embodiment, given the world coordinates of the ground feature points and the pixel coordinates of corresponding pixel plane feature points, homography-matrix-estimation subsystem 610 can apply a DLT technique to obtain an estimation of the homography matrix.

Parameter-initialization subsystem 612 can be responsible for initializing (or finding an initial estimate of) the extrinsic parameters of the camera. In some embodiments, initializing the extrinsic parameters can include applying a direction constraint on the homography matrix (e.g., to ensure that $t_y > 0$) and normalizing the parameters. Parameter-optimization subsystem 614 can be responsible for finding the optimized camera extrinsic parameters. In some embodiments, parameter-optimization subsystem 614 can use the LM algorithm to find parameters that can minimize the inverse-projection error of points projected from the pixel plane to the ground plane.

Vanishing-line-computing subsystem 616 can be responsible for computing a theoretical vanishing line for the ground plane based on the intrinsic and extrinsic parameters of the camera. In some embodiments, the vanishing line can be computed according to Equation (21). Vanishing-point-estimation subsystem 618 can be responsible for estimating, within each image frame, a vanishing point for a cluster of parallel lines. In some embodiments, vanishing-point-estimation subsystem 618 can detect a number of lane lines in the vicinity of the vehicle, fit the detected lane lines to straight lines, and find a point with a minimal sum of the squared distances from that point to every straight line.

V2V-distance-computing subsystem 620 can be responsible for computing the distance between the vanishing point in each image frame and the theoretical vanishing line. In some embodiments, the V2V distance can be computed based on Equation (23). V2V-distance-statistics-collection subsystem 622 can be responsible for collecting the statistics about the V2V distance from a stream of image frames. In some embodiments, the stream of image frames can be captured by the camera within a predetermined interval. In one example, a histogram can be constructed to indicate the distribution of the V2V distance. In another example, V2V-distance-statistics-collection subsystem 622 can compute the average value of the V2V distances in the stream of image frames. Recalibration-notification subsystem 624 can be responsible for generating a notification in response to determining that recalibration of the camera's extrinsic parameters is needed. In some embodiments, recalibration-notification subsystem 624 can determine that recalibration is needed based on statistics about the V2V distances. The recalibration notification can be sent to the upper layer control system, which can then schedule and perform recalibration accordingly.

Figure 7:
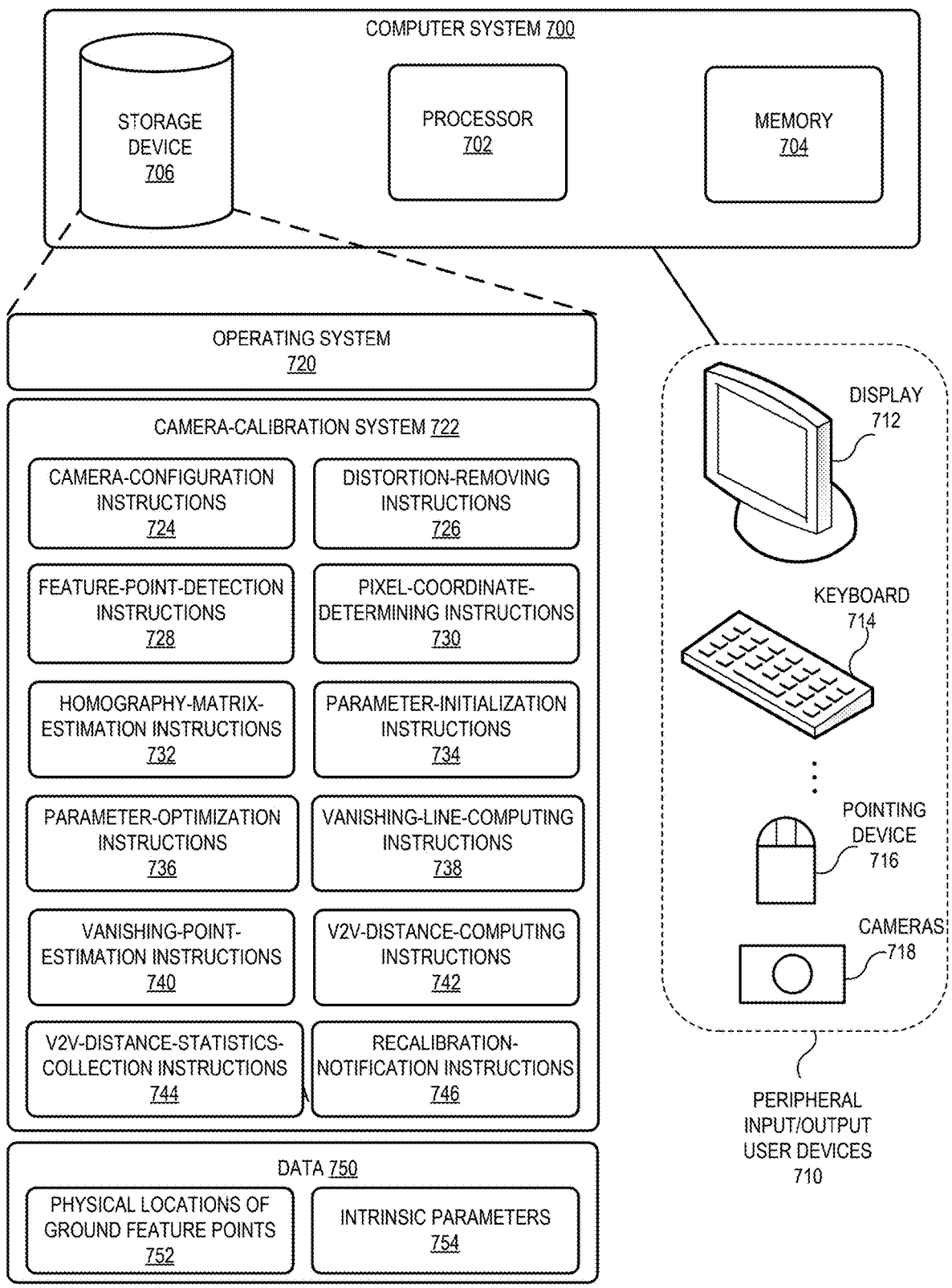
FIG. 7 illustrates an exemplary computer system for performing camera calibration and self-inspection, according to one embodiment of the instant application.

FIG. 7 illustrates an exemplary computer system for performing camera calibration and self-inspection, according to one embodiment of the instant application. Computer system 700 includes a processor 702, a memory 704, and a storage device 706. Furthermore, computer system 700 can be coupled to peripheral input/output (I/O) user devices 710, e.g., a display device 712, a keyboard 714, a pointing device 716, and cameras 718. Storage device 706 can store an operating system 720, a camera-calibration system 722, and data 750. In some embodiments, computer system 700 can be implemented as part of an advanced driver-assistance system (ADAS) or an automated driving system (ADS) installed on a vehicle.

Camera-calibration system 722 can include instructions, which when executed by computer system 700, can cause computer system 700 or processor 702 to perform methods and/or processes described in this disclosure. Specifically, camera-calibration system 722 can include instructions for configuring the camera to capture images (camera-configuration instructions 724), instructions for removing distortions from images captured by a to-be-calibrated or to-be-inspected camera (distortion-removing instructions 726), instructions for detecting distinctive feature points in the captured images (feature-point-detection instructions 728), instructions for determining pixel coordinates of the detected feature points (pixel-coordinate-determining instructions 730), instructions for estimating a homography matrix between the ground plane and the pixel plane (homography-matrix-estimation instructions 732), instructions for generating an initial estimate of the extrinsic parameters (parameter-initialization instructions 734), instructions for performing optimization to determine the camera's extrinsic parameters (parameter-optimization instructions 736), instructions for computing a theoretical vanishing line for the ground plane (vanishing-line-computing instructions 738), instructions for estimating a vanishing point in each image frame (vanishing-point-estimation instructions 740), instructions for computing the vanishing point-to-vanishing line (V2V) distance in each image frame (V2V-distance-computing instructions 742), instructions for collection statistics about the V2V distance from a plurality of image frames (V2V-distance-statistics-collection instructions 744), and instructions for notifying the upper layer control system or the user when recalibration is needed (recalibration-notification instructions 746). Data 750 can include physical locations of ground feature points 752 and intrinsic parameters 754.

In general, this disclosure presents a solution to the problem of calibrating the extrinsic parameters of an on-vehicle camera. A to-be-calibrated camera can capture an image of a ground plane comprising a plurality of feature points with known physical locations. Pixel locations of those feature points in the image plane can be determined. A homography matrix that can transform world coordinates of feature points on the ground plane to pixel coordinates of the corresponding feature points in the image plane can be determined based on a small number (e.g., five or more) of feature points. A number of practical constraints can be applied to the homography matrix to obtain an estimated extrinsic matrix. An initial estimate of the camera extrinsic parameters can be determined based on the estimated extrinsic matrix. Optimization (e.g., using the LM algorithm) can be performed to find extrinsic parameters that can minimize the inverse-projection errors of feature points from the image plane to the ground plane. Subsequent to the calibration of the extrinsic parameters, the calibration system can also perform self-inspection while the vehicle is in motion to determine whether recalibration is needed. Performing the self-inspection can involve obtaining a stream of images captured by the camera while the vehicle is in motion, computing a theoretical vanishing line based on previously calibrated extrinsic parameters, and estimating, in each image, a vanishing point for a group of parallel lines. Performing the self-inspection can further include computing, for each image, the distance between the vanishing point and the theoretical vanishing line (i.e., the V2V distance) and collecting statistics about the V2V distance from all images in the stream of images. Based on the collected statistics, the calibration system can determine whether the current extrinsic parameters of the camera deviate from the previously calibrated values, and if so, it can send a recalibration notification.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices, solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the optimized parameters from the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method for calibrating extrinsic parameters of a camera mounted on a vehicle, the method comprising:
    capturing, by the camera while the vehicle is parked, an image of a plurality of feature points with known world coordinates measured in a world coordinate system, wherein the plurality of feature points are positioned on a ground plane upon which the vehicle is parked;
    determining, based on the captured image, pixel coordinates of the plurality of feature points measured in a pixel coordinate system, wherein the plurality of feature points are projected from the ground plane to an image plane of the camera;
    estimating a homography matrix between the ground plane and the image plane based on a subset of the plurality of feature points;
    generating an initial estimate of the extrinsic parameters based on the estimated homography matrix, the generation comprising converting the estimated homography matrix to an extrinsic matrix by applying a camera direction constraint and a normalization constraint; and
    applying an optimization technique to obtain calibrated extrinsic parameters based on the initial estimate of the extrinsic parameters, the world coordinates of the plurality of feature points, and the pixel coordinates of the plurality of feature points, wherein applying the optimization technique comprises minimizing inverse-projection errors of the plurality of feature points from the image plane to the ground plane.

2. The method of claim 1, wherein minimizing the inverse-projection errors comprises:
    constructing an error vector with a respective component in the error vector corresponding to an inverse-projection error of a feature point, wherein the inverse-projection error indicates a distance on the ground plane between the feature point and a projection of the feature point from the image plane to the ground plane; and
    computing a Euclidean norm of the error vector.

3. The method of claim 1, wherein the optimization technique comprises an Levenberg-Marquardt (LM) technique.

4. The method of claim 1, further comprising removing distortions from the image based on predetermined intrinsic parameters of the camera.

5. The method of claim 1, further comprising determining whether recalibration of the extrinsic parameters is needed subsequent to deploying the vehicle to road operations.

6. The method of claim 5, further comprising:
    determining a theoretical vanishing line based on the calibrated extrinsic parameters;
    obtaining a stream of images captured by the camera while the vehicle is in motion;
    determining a vanishing point in each image of the stream of images;
    determining a distance between the vanishing point and the theoretical vanishing line; and
    collecting statistics about the distance from all images in the stream of images.

7. The method of claim 6, wherein determining the vanishing point comprises:
    detecting multiple lane lines in the image;
    fitting the multiple lane lines to corresponding straight lines; and
    determining a point in the image with a minimum sum of squared distances from the point to the straight lines.

8. The method of claim 6, wherein collecting the statistics about the distance comprises constructing a histogram indicating a distribution of the distance.

9. The method of claim 5, further comprising:
    generating a notification in response to determining that recalibration of the extrinsic parameters is needed.

10. A computing system, comprising:
    a processor; and
    a memory coupled to the processor and storing instructions that when executed by the processor cause the processor to perform a method for calibrating extrinsic parameters of a camera mounted on a vehicle, the method comprising:
    configuring the camera to capture, while the vehicle is parked, an image of a plurality of feature points with known world coordinates measured in a world coordinate system, wherein the plurality of feature points are positioned on a ground plane upon which the vehicle is parked;
    determining, based on the captured image, pixel coordinates of the plurality of feature points measured in a pixel coordinate system, wherein the plurality of feature points are projected from the ground plane to an image plane of the camera;
    estimating a homography matrix between the ground plane and the image plane based on a subset of the plurality of feature points;
    generating an initial estimate of the extrinsic parameters based on the estimated homography matrix, the generation comprising converting the estimated homography matrix to an extrinsic matrix by applying a camera direction constraint and a normalization constraint; and
    applying an optimization technique to obtain calibrated extrinsic parameters based on the initial estimate of the extrinsic parameters, the world coordinates of the plurality of feature points, and the pixel coordinates of the plurality of feature points, wherein applying the optimization technique comprises minimizing inverse-projection errors of the plurality of feature points from the image plane to the ground plane.

11. The computing system of claim 10, wherein minimizing the inverse-projection errors comprises:
    constructing an error vector with a respective component in the error vector corresponding to an inverse-projection error of a feature point, wherein the inverse-projection error indicates a distance on the ground plane between the feature point and a projection of the feature point from the image plane to the ground plane; and
    computing a Euclidean norm of the error vector.

12. The computing system of claim 10, wherein the optimization technique comprises an Levenberg-Marquardt (LM) technique.

13. The computing system of claim 10, wherein the method further comprises removing distortions from the image based on predetermined intrinsic parameters of the camera.

14. The computing system of claim 10, wherein the method further comprises determining whether recalibration of the extrinsic parameters is needed subsequent to deploying the vehicle to road operations.

15. The computing system of claim 14, wherein the method further comprises:
- determining a theoretical vanishing line based on the calibrated extrinsic parameters;
- obtaining a stream of images captured by the camera while the vehicle is in motion;
- determining a vanishing point in each image of the stream of images;
- determining a distance between the vanishing point and the theoretical vanishing line; and
- collecting statistics about the distance from all images in the stream of images.

16. The computing system of claim 15, wherein determining the vanishing point comprises:
- detecting multiple lane lines in the image;
- fitting the multiple lane lines to corresponding straight lines; and
- determining a point in the image with a minimum sum of squared distances from the point to the straight lines.

17. The computing system of claim 15, wherein collecting the statistics about the distance comprises constructing a histogram indicating a distribution of the distance.

18. The computing system of claim 14, wherein the method further comprises generating a notification in response to determining that recalibration of the extrinsic parameters is needed.

* * * * *